Jan. 10, 1928.
O. GUERRITORE
1,655,786
VEHICLE SPRING SUSPENSION
Filed June 30, 1925
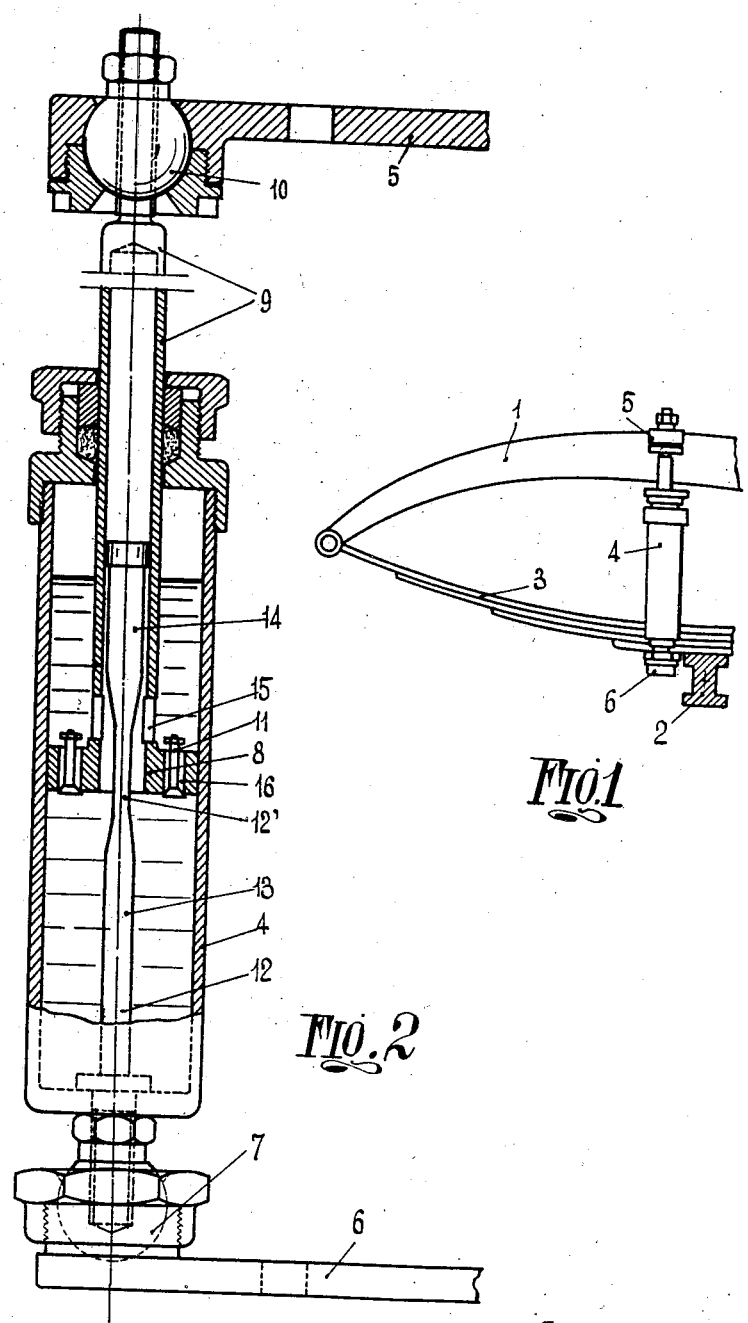
Inventor:
O. Guerritore Patented Jan. 10, 1928.

1,655,786

UNITED STATES PATENT OFFICE.

ORAZIO GUERRITORE, OF ROME, ITALY.

VEHICLE SPRING SUSPENSION.

Application filed June 30, 1925, Serial No. 40,697, and in Italy July 9, 1924.

The present invention relates to cushioning suspension means for vehicles and it has for its object a suspension arrangement in which each suspension set comprises a spring member having a resilient action which would be insufficient by itself for suspension purposes, in combination with a damper or absorber whose action supplements that of said spring member in shock absorption said damper having actions of different values in respect of deformations in opposite directions of said spring member and having a variable action in the stroke in one of said directions.

On the annexed drawing is shown by way of example an embodiment of the present invention and Figure 1 is a side view of a suspension set for the resilient interconnection of the frame and axle of a vehicle;

Figure 2 is a sectional view to an enlarged scale of a liquid damper adapted for the purposes of the present invention.

In said drawing 1 is a portion of the frame of a vehicle and 2 is an axle of the same which is connected with said frame by means of a laminated spring 3 while 4 is a liquid damper comprising two respectively movable parts 4 and 8 as hereinafter described, which are connected by means of arms 5 and 6 with said frame 1 and axle 2 by means of ball joints as hereinafter described.

The spring 3 has a resilient action less than, or it is weaker than, it should have, or be, in the same load conditions, under normal arrangement, that is in an arrangement in which the said spring must comply entirely with the suspension duties, and such a spring 3 would therefore not be sufficient to provide the required spring action without the cooperation of said liquid damper or absorber.

As shown in Figure 2, the said liquid damper comprises a cylinder 4 containing a suitable liquid and having at its bottom end a ball head 7 connected with arm 6 and axle 2, and a piston 8 whose stem has a top ball head 10 seated in a ball socket of arm 5; as illustrated said ball head 10 is adjustable on stem 9 being screwed thereon.

In piston 8 are provided ports 16 having valves 11 arranged for lost motion with respect to their seats in said piston ports, said valves sealing their respective ports when the piston 8 moves towards the bottom of said cylinder 4 and leaving them open when said piston moves in opposite direction, the stem 9 is hollow and a stem 12 solid with the cylinder 4 extends into the bore of said hollow stem 9.

Said hollow stem 9 has slots 15 in its wall near said piston 8 to provide passages from the hollow of said stem to the space within cylinder 4 above piston 8.

The spindle 12 extending into the bore of the hollow stem 9 has different sizes or sectional areas along its length, to throttle to different extents the flow of liquid from each other of chambers provided by piston 8 in said cylinder 4.

In the construction illustrated said stem 12 has a minimum size or contracted sectional area in its intermediate portion 12′ and its size is increasing on approaching its end portions 13 and 14, its size or diameter being larger at 14 than at 13 and said stem 12 providing a throttled annular passage between it and the edge of bore of piston 8 in register with said end portions.

When the vehicle suspension parts are in conditions of usual load and running the parts in the position of Figure 2, that is the contracted portion 12′ of stem 12 is in register with the bore of piston 8.

When reduced shocks occur, the piston 8 moves from its normal position in cylinder 4, that is from position shown in Figure 2, without its motion being materially damped owing to the large passage left for liquid through bore of piston 8 and slots 15, and therefore the suspension operates in the same manner as it comprised merely the laminated spring 3 which is very flexible in view of its above described character.

Should heavier shocks take place, piston 8 moves towards the bottom of cylinder 4 and during such a stroke the valves 11 are closed and the passage for liquid flow around stem 12 is gradually throttled and therefore an additional damping action is obtained which supplements that of spring 3 and is varying according to a rule depending upon the shape of the stem 12, the motion of parts 8—9—10—5—1 with respect to parts 4—7—6—2 being efficiently damped.

After the impact stroke is completed, the reaction of spring 3 moves gradually the parts 8 away from the bottom of cylinder 4; in this return stroke valves 11 are open and the passage for the flow of liquid through bore of stem 9 and piston 8 and slots 15 is increased, the contracted portion 12' of said stem 12 being carried in register with said bore.

During the return stroke of the parts the liquid damper has an action of gradually decreasing value in order to enable the spring 3 to come back in its normal conditions in a short time for the purpose of making it again operative, but on said spring taking up its normal position, or configuration, the enlarged portion 14 of stem 12 comes in register with the bore of piston 8 and therefore the respective motion of the parts is effectively damped; as above described the portion 14 of stem 12 is larger than portion 13 and therefore the action damping the piston motion is at this time nearly the same as that found at the end of the impact stroke in spite of the fact that valves 11 are open.

The spring deformation is thus more and more efficiently damped as said spring moves off from its normal configuration.

Of course the present invention is not confined to the above described embodiment and it is subject to modifications within the ranges of the appended claims.

In the described arrangement the action of the absorber or damper and the spring member are availed of independently of each other and each in best conditions; the spring member may have a reduced damping action with respect to ordinary conditions and therefore the oscillations of small amplitude due to light shocks are absorbed by said sensitive spring member while heavier actions are taken up by the shock damper having a stronger damping action.

What I claim as my invention and desire to secure by United States Letters Patent is:—

1. A resilient suspension arrangement for vehicles, comprising in combination a spring member connected with the vehicle frame and axle and having by itself a weaker action than that required for damping heavy shocks under usual road and running conditions, and a damper which is inoperative within the ranges of oscillations of small amplitude around the normal configuration of said spring member and which has an abruptly strong and a further increasing damping action on the downward movement of said vehicle frame and spring member from said normal configuration, while on the subsequent return movement of said vehicle frame and spring member towards said normal configuration said damper exerts a damping action which is small, at the beginning of said return movement and is further decreasing, and in the upward movement beyond said normal configuration said damper exerting an increasing damping action whose increment is larger than the increment during the first named downward movement.

2. A resilient suspension arrangement for vehicles comprising in combination a spring member connected with the vehicle frame and axle and having by itself a weaker action than that required for damping heavy shocks under usual load and running conditions, and a damper comprising two respectively movable members which oppose substantially no resistance within the ranges of oscillations of small amplitude around the normal configuration of said spring member, and which oppose an abruptly strong and a further increasing damping action on the downward movement of said vehicle frame and spring member from said normal configuration, while on the subsequent upward return movement of said vehicle frame and spring member towards said normal configuration said damper exerts a damping action which is small at the beginning of said return movement and is further decreasing, and in the upward movement beyond said normal configuration said damper exerting an increasing damping action whose increment is larger than the increment during the first named downward movement.

3. A resilient suspension arrangement for vehicles comprising in combination a spring member connected with the vehicle frame and axle and having by itself a weaker action than that required for damping heavy shocks under usual load and running conditions and a liquid damper comprising two respectively movable members providing a variable passage for the damping flow of a liquid, said members providing a free passage for said liquid when they are in positions within a restricted range of oscillations of said spring member around its normal configuration, a strongly throttled passage at the beginning of the downward movement of the vehicle frame and spring member from said normal configuration said passage being further throttled along the prosecution of said downward movement, and a less throttled passage at the beginning of the subsequent upward return stroke of said vehicle frame and spring member towards said normal configuration, said passage becoming further less throttled along the prosecution of said return movement until said normal configuration is again attained and being again throttled with a larger throttle increment than in said first named downward motion along the further upward movement beyond said normal configuration.

4. A resilient suspension arrangement for vehicles, comprising in combination a spring member connected with the vehicle frame and axle and having by itself a weaker action with respect to that required for damping heavy shocks under usual load and running conditions and a liquid damper comprising respectively movable piston and cylinder, each connected with one of said frame and axle, said parts having passages leading from one to other of the spaces provided by said piston in said cylinder, valves closing said passages during the respective motion of said piston and cylinder in one direction, said piston and associate stem having a bore and slots leading from said bore to one of said spaces, and a member solid with said cylinder and extending in said bore, said member having a contracted portion which is in register with said bore and slots within a restricted range of oscillation of said sensitive spring member around its normal configuration and enlarged portions coming in register with said slots and bore when said piston and cylinder move respectively beyond said ranges.

In testimony whereof I have signed my name to this specification.

ORAZIO GUERRITORE.